United States Patent
Picault et al.

(10) Patent No.: US 9,251,525 B2
(45) Date of Patent: Feb. 2, 2016

(54) DEVICE FOR DETERMINING POTENTIAL FUTURE INTERESTS TO BE INTRODUCED INTO PROFILE(S) OF USER(S) OF COMMUNICATION EQUIPMENT(S)

(75) Inventors: Jerome Picault, Nozay (FR); Dimitre Davidov Kostadinov, Nozay (FR); Makram Bouzid, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/502,191

(22) PCT Filed: Sep. 24, 2010

(86) PCT No.: PCT/EP2010/064101
§ 371 (c)(1),
(2), (4) Date: Jul. 2, 2012

(87) PCT Pub. No.: WO2011/045162
PCT Pub. Date: Apr. 21, 2011

(65) Prior Publication Data
US 2012/0265816 A1    Oct. 18, 2012

(30) Foreign Application Priority Data
Oct. 16, 2009 (EP) ................................ 09305989

(51) Int. Cl.
*G06F 17/30* (2006.01)
*H04N 21/442* (2011.01)
(Continued)

(52) U.S. Cl.
CPC .......... *G06Q 30/02* (2013.01); *G06F 17/30702* (2013.01); *H04L 67/303* (2013.01);
(Continued)

(58) Field of Classification Search
CPC  G06N 99/005; H04L 29/08675; H04L 67/30; H04L 67/303; H04L 67/306; H04N 21/44213; H04N 21/466; G06F 17/30699; G06F 17/30702
USPC ...................................... 709/204; 706/45–62
See application file for complete search history.

(56) References Cited

U.S. PATENT DOCUMENTS 7,620,967 B2 * 11/2009 Farineau ................ H04H 20/40
                                                          375/316
7,958,066 B2 *  6/2011 Pinckney ............. G06N 99/005
                                                          706/12
(Continued)

OTHER PUBLICATIONS

Velasquez, J.D.; Yasuda, H.; Aoki, T.; Weber, R., "Acquiring knowledge about user's preferences in a Web site," Aug. 11-13, 2003, International Conference on Information Technology, pp. 375-379.*
(Continued)

*Primary Examiner* — Eleni Shiferaw
*Assistant Examiner* — Nelson Giddins
(74) *Attorney, Agent, or Firm* — Fay Sharpe LLP

(57) ABSTRACT

A device (D) is intended for determining potential interests of users (U1-U3) that are clients of at least one network operator, each user being associated to a profile defining at least his interests. This device (D) comprises i) a tracking means (TM) arranged for analyzing the profile of at least one user (U1) to determine new real interest(s) it contains and for storing an identifier representative of a determined new real interest of this user (U1) in correspondence with a first date at which it has been considered as a new real interest into his profile, and ii) a recommendation means (RM) arranged for analyzing the first dates of a user (U1) to determine a time ordered sequence of interests preceding a determined new real interest, and for comparing this determined user interest sequence to at least one other sequence of interests of at least one other user (U2) to predict at least one potential future interest for this user (U1), to be introduced into his profile.

20 Claims, 2 Drawing Sheets

(51) Int. Cl.
*H04L 29/08* (2006.01)
*H04N 21/466* (2011.01)
*G06Q 30/02* (2012.01)

(52) U.S. Cl.
CPC ............ *H04L67/306* (2013.01); *H04N 21/466* (2013.01); *H04L 29/08675* (2013.01); *H04L 67/30* (2013.01); *H04N 21/44213* (2013.01)

(56) References Cited

U.S. PATENT DOCUMENTS

| | | | | |
|---|---|---|---|---|
| 7,970,934 | B1* | 6/2011 | Patel | H04L 41/147 709/244 |
| 8,019,777 | B2* | 9/2011 | Hauser | G06F 17/30867 707/723 |
| 8,032,480 | B2* | 10/2011 | Pinckney | G06N 99/005 706/45 |
| 8,055,664 | B2* | 11/2011 | Baluja | G06N 5/02 705/14.7 |
| 8,229,873 | B1* | 7/2012 | Dolan | G06Q 30/00 706/45 |
| 8,606,797 | B2* | 12/2013 | Sakanaka | H04N 7/163 707/751 |
| 2002/0173971 | A1* | 11/2002 | Stirpe | G06F 17/30867 705/14.53 |
| 2007/0250467 | A1* | 10/2007 | Mesnik | G06F 17/3089 |
| 2008/0114756 | A1* | 5/2008 | Konig | G06F 17/30867 |
| 2008/0195456 | A1* | 8/2008 | Fitzpatrick | G06F 17/30867 705/7.15 |
| 2008/0200153 | A1* | 8/2008 | Fitzpatrick | G06F 17/30867 455/414.1 |
| 2008/0201305 | A1* | 8/2008 | Fitzpatrick | G06F 17/30867 |
| 2008/0275861 | A1* | 11/2008 | Baluja | G06N 5/02 |
| 2009/0012955 | A1* | 1/2009 | Chu | G06Q 30/0261 |
| 2009/0099996 | A1* | 4/2009 | Stefik | G06F 17/30648 706/54 |
| 2009/0187540 | A1* | 7/2009 | Richardson | G06F 17/30867 |
| 2009/0228774 | A1* | 9/2009 | Matheny | G06F 17/30873 715/201 |
| 2009/0248494 | A1* | 10/2009 | Hueter | G06Q 10/00 705/7.29 |
| 2009/0249129 | A1* | 10/2009 | Femia | G06F 11/008 714/47.2 |
| 2009/0299945 | A1* | 12/2009 | Hangartner | G06N 5/02 706/50 |
| 2009/0307159 | A1* | 12/2009 | Pinckney | G06Q 30/0601 706/11 |
| 2010/0131443 | A1* | 5/2010 | Agarwal | G06F 17/30867 706/46 |
| 2010/0250341 | A1* | 9/2010 | Hauser | G06F 17/30867 707/769 |
| 2010/0280985 | A1* | 11/2010 | Duchon | G06Q 10/10 706/52 |
| 2010/0332330 | A1* | 12/2010 | Goel | G06Q 30/02 705/14.66 |
| 2011/0106743 | A1* | 5/2011 | Duchon | G06F 17/30705 706/46 |
| 2011/0208736 | A1* | 8/2011 | Fitzpatrick | G06F 17/30867 707/736 |
| 2011/0276396 | A1* | 11/2011 | Rathod | G06F 17/30867 705/14.49 |
| 2011/0302117 | A1* | 12/2011 | Pinckney | G06Q 30/02 706/12 |
| 2011/0307478 | A1* | 12/2011 | Pinckney | G06N 99/005 707/724 |
| 2012/0311083 | A1* | 12/2012 | Julia | G06F 17/30035 709/217 |
| 2013/0086089 | A1* | 4/2013 | Banda | G06F 17/30029 707/754 |
| 2013/0159995 | A1* | 6/2013 | Senot | G06F 8/62 717/178 |

OTHER PUBLICATIONS

Ting Chen; Wei-Li Han; Hai-Dong Wang; Yi-Xun Zhou; Bin Xu; Bin-Yu Zang, "Content Recommendation System Based on Private Dynamic User Profile," Aug. 19-22, 2007, Machine Learning and Cybernetics, 2007 International Conference, vol. 4, pp. 2112-2118.*
International Search Report for PCR/EP2010/064101 dated Dec. 27, 2010.
Wang, et al, "Mining Interest Navigation Patterns with Hidden Markov Model", Joint Research & Development Laboratory for Advanced Computer and Communication Technologies, pp. 105-110.
Goethals, B., "Survey on frequent pattern mining", Technical report, Helsinki Institute for Information Technology, 2003.
Sivaselvan, B. et al, "An efficient frequent temporal pattern mining algorithm," Information Technology Journal, vol. 5, pp. 1043-1047, 2006.
Suzuki, T. et al., "Learning to estimate user interest utilizing the Variational Bayes' estimator", Proceedings of 5th International Conference on Intelligent Systems Design and Applications, Wroclaw, Poland, 94-99, 2005.
Yu, Y., et al., "Mining Interest Navigation Patterns Based on Hybrid Markov Model", Lecture Notes in Computer Science vol. 4027/2006, pp. 470-478, Springer, 2006.

* cited by examiner

DEVICE FOR DETERMINING POTENTIAL FUTURE INTERESTS TO BE INTRODUCED INTO PROFILE(S) OF USER(S) OF COMMUNICATION EQUIPMENT(S)

BACKGROUND

The present invention relates to the recommendation of content items for users of communication equipments capable of being connected to at least one communication network, and more precisely to personalization of user content recommendations.

One means here by "user profile" a set of data (or metadata) describing the identity of a user, such as socio-demographic data and interests (or preferences or else habits) relative to one or more subjects (television programs, radio programs, news, music, advertising, entertainment, items to buy or use of services, for instance). (Meta)Data describing user interests can be words or expressions or else concepts that most of the time may be found also in the descriptions that are associated to the content items.

Moreover, one means here by "user content recommendations" recommendations (or suggestions) of content items that are proposed to a user based on interests (or preferences or else habits) contained into his profile.

More, one means here by "concept" something defined by one or more words or from one or several taxonomies or ontologies, and therefore associated to a semantic content. It is usually described by a set of at least one property (i.e. a set of descriptors having a type and a value).

One major challenge in the domain of personalization of user content recommendations is to understand the interests of users as properly as possible in order to provide them with content items suited to their respective needs.

As it is known by the man skilled in the art, usual techniques for content recommendation (such as content-based filtering algorithms) do not allow introducing in the user profiles concepts that did not appear in the descriptions of content that have been consumed by the users. Indeed, when a content item is consumed by a user, metadata that describe this content item can be added (according to various heuristics) to the user profile, and then recommendations are generated on the basis of similarities between the user profile and the content metadata. So, content items for which there are no corresponding metadata in a user profile will not be recommended to the user.

These approaches tend to overspecialise the recommendations and do not enable to add enough diversity/discovery in the recommendations. More precisely, these approaches do not allow anticipating user interests: the user must have consumed something described by a concept (or equivalent) to have further recommendations related to that concept. For example, with existing systems if a user liked one book of Victor Hugo, the recommender system will tend to recommend him other books of Victor Hugo, whereas this user (but also many others) may be interested in discovering other writers, just because his (their) taste(s) evolve(s) naturally with time and also because of the influence of the items he (they) has (have) consumed, and of other interests he (they) may have had in the meantime.

Other approaches have been recently proposed to improve the user content recommendations.

A first approach concerns the so-called "collaborative recommenders". Typical collaborative recommenders comprise a core mechanism consisting in finding hidden links between users based on the similarity of their preferences or historic behaviour. Items are recommended to a certain user with respect to the interests he shares with other users or according to opinions, comparatives, and ratings of items given by other users having similar profiles.

So, in this first approach, the comparison between users and items is done globally, without taking into account the temporal dimension, and therefore this approach may be not very relevant when there is a strong dependency between two items. Moreover, even if collaborative recommenders allow to bring some diversity in the recommendations, they are not able to address directly the problem of anticipating the next (or future) user interests. More, collaborative recommenders require a significant number of user ratings in order to be effective (this is the so called "cold-start problem").

A second approach concerns the so-called "frequent pattern mining algorithms". These algorithms enable finding dependencies between the appearance of items in a set of transactions, as described notably in the article of Goethals, B., "Survey on frequent pattern mining", Technical report, Helsinki Institute for Information Technology, 2003. The goal of a frequent pattern mining algorithm is to find a set of frequent and confident association rules of the form "X⇒ Y", which means: "if the set of items X appears in a transaction, then another set of items Y also appears in that transaction". An association rule is considered as frequent if the ratio between the number of transactions in which X and Y appear together and the total number of transactions satisfies a frequency threshold. Similarly, an association rule is confident if the percentage of transactions where X and Y appear together among all transactions containing X is greater than a confidence threshold.

Even if frequent pattern mining algorithms enable finding relationship between items, they are only concerned with the presence of items in transactions, but they do not consider the moment of appearance of preferences (or items). There exist approaches for frequent temporal pattern mining (for example the one described in the article of Sivaselvan, B. et al, "An efficient frequent temporal pattern mining algorithm," Information Technology Journal, vol. 5, pp. 1043-1047, 2006) which takes into account the order of appearance of items in transactions. However, the temporality is considered in terms of the number of items separating the two frequent sets of items and not in terms of the time elapsed between them.

A third approach concerns the so-called "temporal probabilistic models". Some probabilistic models have been proposed for user interest and interest transition capturing and predicting. They have been notably described in the article of Suzuki, T. et al., "Learning to estimate user interest utilizing the Variational Bayes' estimator", Proceedings of 5th International Conference on Intelligent Systems Design and Applications, Wroclaw, Poland, 94-99, 2005, and in the article of Wang, S. et al, "Mining Interest Navigation Patterns with Hidden Markov Model", Lecture Notes in Computer Science Volume 4027/2006, pp. 470-478, Springer, 2000.

These last models have been conceived for single user interest transition capturing, but not for applying captured interest transition patterns of one user to similar users.

SUMMARY OF THE EXEMPLARY EMBODIMENT

So the object of this invention is to anticipate future users' interests, in order to improve users' acceptance and confidence in recommender systems, and alleviate drawbacks of content-based recommender systems which require prior observations prior to updating user interests.

For this purpose, the invention provides a device, intended for determining potential interest(s) of user(s) that is/are client(s) of at least one network operator, each user being associated to a profile defining at least his interests, and comprising:
- a tracking means arranged for analyzing the profile of at least one user to determine new real interest(s) it contains and for storing an identifier representative of a determined new real interest of this user in correspondence with a first date at which it has been considered as a new real interest into his profile, and
- a recommendation means arranged for analyzing the first dates of a user to determine a time ordered sequence of interests preceding a determined new real interest and for comparing this determined user interest sequence to at least one other sequence of interests of at least one other user to predict at least one potential future interest for said user, to be introduced into his profile.

The device according to the invention may include additional characteristics considered separately or combined, and notably:
- its recommendation means may be arranged for comparing the determined user interest sequence to at least one other sequence of interests, determined into a graph of interests built from the interests of other users, to predict at least one potential future interest of this user;
- its recommendation means may be arranged for building and updating the interest graph from the stored real interests of the users;
- Its recommendation means may be arranged for building and updating an interest graph which models the evolution of interests over time for a plurality of users;
- in a variant, its recommendation means may be arranged for building and updating an auxiliary interest graph which models the evolution of interests over time for one user then for aggregating this auxiliary interest graph with auxiliary interest graphs built for other users to produce an interest graph;
- its recommendation means may be arranged for building and updating a directed and weighted interest graph G(V, W), where V is a set of nodes representing respectively the user interests, and W is a set of directed edges representing a transition from a user interest to another user interest;
- its recommendation means may be arranged for assigning a weight to each of the directed edges, each weight being defined by a table establishing a correspondence between each user and an elapsed time between the appearances of first an second consecutive real interests;
- its recommendation means may be arranged for updating the interest graph each time it is informed by the tracking means that it has determined a new real interest of a user;
- its recommendation means may be arranged for determining at least one statistical metric from the weights assigned to the directed edges and for using each determined statistical metric with heuristics to suggest interests adapted to a chosen applicative context and then to predict at least one potential future interest for the user from these suggested interests:
  - at least one statistical metric may be representative of the relevance between two interests;
  - at least one statistical metric may be representative of the frequency of a transition between two interests;
- its tracking means may be arranged for determining the consumption of content items of the user that are related to an interest contained into his profile and for considering that this interest is a new real interest when this determined consumption of the related content items is greater than a chosen threshold;
- its tracking means may be arranged for considering that the first date of an interest is the date at which it detects that a content item consumption related to this interest is greater than the chosen threshold;
- its recommendation means may be arranged for determining a favourable date for introducing the potential future interest into the profile of the user.

The invention also provides a network equipment, for at least one communication network, and comprising a device such as the one above introduced, intended for working in a centralized manner to predict potential future interests for a plurality of users.

The invention also provides a user communication equipment intended for being connected to at least one communication network, and comprising a device such as the one above introduced, intended for predicting potential future interests for its user.

DESCRIPTION OF THE DRAWINGS

Other features and advantages of the invention will become apparent on examining the detailed specifications hereafter and the appended drawings, wherein.

The appended drawings may serve not only to complete the invention, but also to contribute to its definition, if need be.

DETAILED DESCRIPTION

The invention aims at offering a device (D) intended for providing potential interest(s) to at least one user (Uj) i) that is client of a network operator, ii) which is equipped with a communication equipment (CE) capable of being connected to a communication network (CN) of this network operator, and iii) which is associated to a profile defining at least his interests.

As mentioned in the introductory part, one means here by "user profile" a set of data (or metadata) describing the identity of a user, such as socio-demographic data and interests (or preferences or else habits) relative to one or more subjects (television programs, radio programs, news, music, advertising, entertainment, items to buy or use of services, for instance). (Meta)Data describing user interests can be words or expressions or else concepts that most of the time may be found also in the descriptions that are associated to the content items.

In the following description it will be considered as example that the communication network (CN) is a wired network, for instance of an ADSL type. But the invention is not limited to this type of communication network. Indeed, it concerns any type of communication network, and therefore as well wireless networks as wired networks.

Due to this assumption, it will be considered in the following description that the user communication equipments (CE)

are fixed or portable computers. But the invention is not limited to this type of communication equipment. Indeed, it concerns any type of communication equipment capable of being connected to a wireless network and/or a wired network. So, a communication equipment could be also a fixed or mobile phone, a personal digital assistant (or PDA), or a set-top box (STB), for instance.

Figure 1:
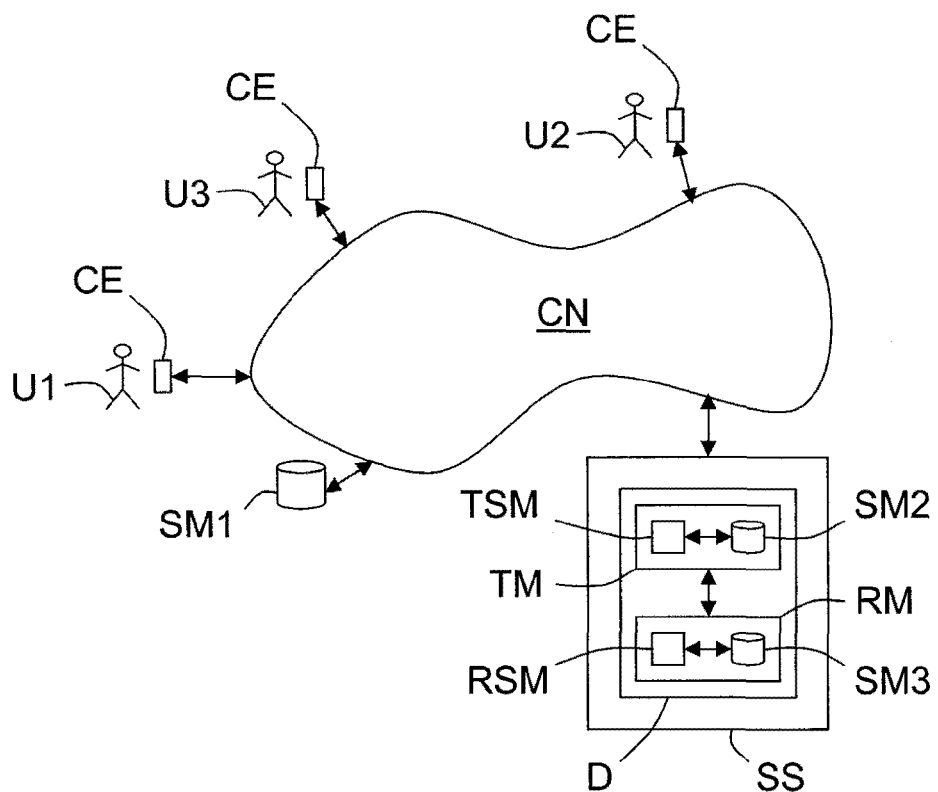
FIG. 1 schematically illustrates a communication network to which are coupled three communication equipments of users and a network equipment comprising an example of embodiment of a device according to the invention.

As illustrated in the non limiting example of FIG. 1, a device D, according to the invention, may be localized into a network equipment SS connected to a communication network CN of a network operator. This network equipment SS may be, for instance, a server SS which is dedicated to the access to information relative to users Uj that are clients of the network operator. This server SS may be a recommender system, for instance. So, in this example the device D works in a centralized manner for a plurality of users Uj (here j=1 to 3). But this device D could be also coupled to a network equipment (also for working in a centralized manner), or located into, or coupled to, a user communication equipment CE for working in a distributed manner for a single user Uj.

This device D can be made of a combination of electronic circuit(s) (or hardware modules) and software modules. In this case it further comprises a software interface allowing interworking between the hardware and software modules. But it could be also made of electronic circuit(s) or of software modules (in this last case it can be stored in a memory or in any computer software product, such as a CD-ROM, for instance).

A device D according to the invention comprises a tracking module TM and a recommender module RM.

This tracking module TM is intended for analyzing the profile of at least one user Uj. It is important to note that in the described example the device D works in a centralized manner for a plurality of users Uj (here j=1 to 3). So it is arranged for analyzing the profiles of all the users Uj of this plurality, which are stored into a first storage means SM1 which belongs to the network operator, for instance, and which are connected to (as illustrated) or comprise into the communication network CN. But in a variant in which the device D is associated to a single user communication equipment CE, the tracking module TM is arranged for analyzing the only profile of this user Uj, which can be stored into a storage means of the user communication equipment CE.

Every analysis is carried out by a sub module TSM of the tracking module TM and aims at determining each new real interest contained into the analyzed user profile. A "new real interest" is either an interest which was already contained into a user profile during a preceding analysis but which was not yet considered as really important for this user, or an interest which was not contained into a user profile during the last analysis and which is immediately considered as really important for this user. So, it is not mandatory that a new real interest be a very new (or recent) interest.

To decide whether an interest (contained into a user profile) is really important for this user Uj, the tracking module TM (and more precisely its sub module TSM) may be arranged for determining the consumption of content items of this user Uj that are related to this interest, and for considering that this interest is a (new) real interest when this determined consumption of the related content items is greater than a chosen threshold $T_{IS}$. This determination of content item consumption can be carried out by the tracking module TM (via the server SS) into the communication network CN (for instance into the server(s) delivering the content items) or into the concerned user communication equipment CE.

Figure 2:
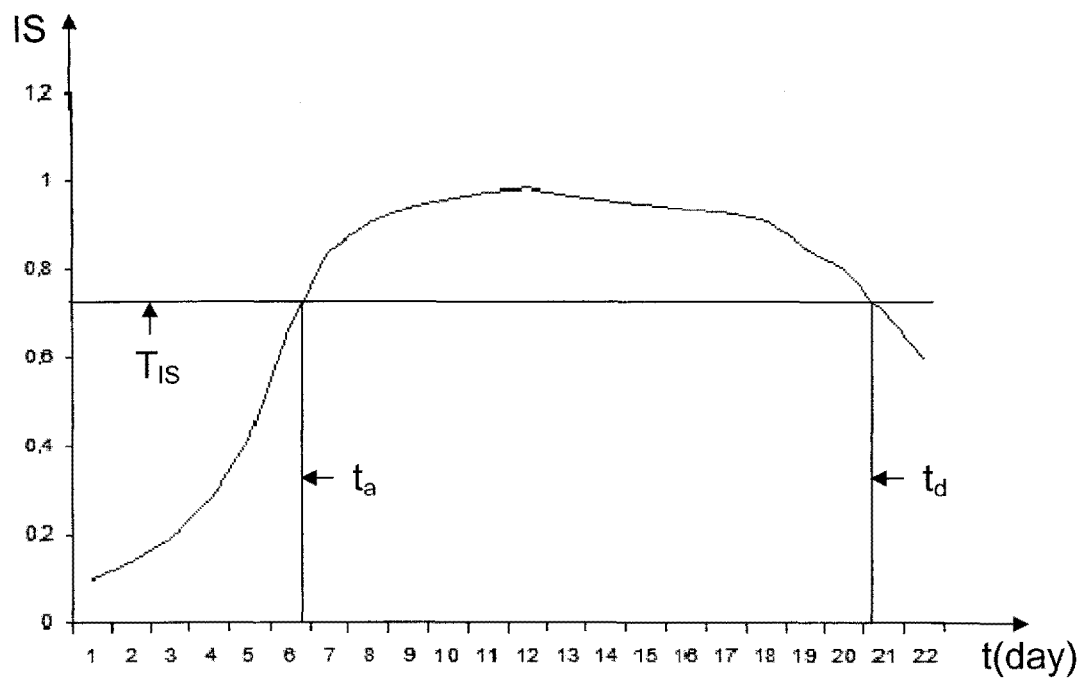
FIG. 2 is a diagram illustrating an example of evolution of an interest strength (IS) of a user over time (t), FIG. 3 schematically illustrates an example of interest graph concerning n users, and FIG. 4 schematically illustrates an example of algorithm intended for building and updating an interest graph iteratively.

An example of evolution over time t of an interest strength IS, representative of the consumption by a user Uj of content items relating to an interest contained into his profile, is illustrated in the diagram of FIG. 2. Generally speaking the interest strength IS is a function of the content consumption. In this diagram the time t is given in days (but it could be also given in months or weeks or else hours depending on the manipulated data and/or concerned application—more generally the unit (t) is chosen to be the most appropriate to describe the evolution of interest strength IS over time (t)) and the chosen threshold $T_{IS}$ is equal to 0.72. Moreover in this example the tracking module TM considers that the interest became really important at the date $t_a$ which corresponds to the time when the IS curve became greater than the threshold $T_{IS}$, i.e. at $t_a$=6.4 days. This date $t_a$ will be called a first date hereafter.

Once the tracking module TM (and more precisely its sub module TSM) has considered that an interest of a user Uj is really important, it stores an identifier representative of this interest in correspondence with an identifier of this user Uj and with the first date at which it has been considered as a new real interest into his profile. The sub module TSM may store the above mentioned data into a second storage means SM2 which may be part of the tracking module TM as illustrated. This second storage means SM2 may be of any type known from the man skilled in the art. So, it may be a database or a repository or else a memory, for instance.

Preferably, the tracking module TM also stores a second date $t_d$ into the second storage means SM2, in correspondence with an interest identifier, an user identifier and a first date $t_a$, when it considers that this user interest is no more a real interest for this user (i.e. when the interest strength IS of this user interest became smaller than the chosen threshold $T_{IS}$). In the diagram of FIG. 2, the second date $t_d$ which corresponds to the time when the IS curve became smaller than the threshold $T_{IS}$, is equal to 20.6 days.

The recommendation module RM (of the device D) is arranged for analyzing the first dates $t_a$ of a user Uj that are stored into the second storing means SM2. This analysis is carried out by a sub module RSM of the recommendation module RM and is intended for determining a time ordered sequence of interests which precede an interest that has just been considered by the tracking module TM as a new real interest for a user Uj.

The recommendation module RM may be informed of the appearance of a new real interest of a user Uj by the tracking module TM or by analyzing the content of the second storage means SM2 on request or automatically (for instance periodically).

A time ordered sequence of interests of a user Uj is a sequence which comprises a list of interests of this user Uj which are ordered according to the first date $t_a$ that are stored into the second storage means SM2 in correspondence of their respective interest identifiers and user identifiers.

Once the sub module RSM has determined a time ordered sequence of interests for a user Uj, it compares this determined user interest sequence to at least one other sequence of interests of at least one other user Uj' (j' ≠j) to predict at least one potential future interest for this user Uj, in order this potential future interest could be introduced into the profile of this user Uj or at least proposed to this user Uj.

So, contrary to known methods, the invention does not recommend items, but it recommends future (or potential) interests for a user Uj, based on sequence(s) of past interests of this user Uj, and on sequences of other interests of other user(s).

The invention exploits temporal dependencies between user interests, which are currently ignored in existing approaches of recommender systems, and which may be deduced from the sequence of interests of other users Uj' if one assumes that some users have similar evolution of their tastes and interests over time. For instance, a user Uj, that starts to be interested in jazz music, may be rapidly interested in a music genre related to jazz music, and/or on specific artist(s) playing notably jazz music, and/or on a sub-genre of jazz music, such as jazz manouche, and/or in concerts related to that emerging interest. In an other example, an interest of a user Uj for a particular natural disaster may trigger interests in social aspects and/or economy. In still an other example, an interest of a user Uj for fashion may trigger a more general interest for online shopping.

The recommendation module RM (and more precisely its sub module RSM) may be arranged for comparing a user interest sequence, that it has just determined into the data relating to this user Uj and stored into the second storage means SM2, to at least one other sequence of interests (preferably the longest one), which can be determined into a graph of interests that has been built from the interests of other users Uj', in order to predict at least one potential future interest of this user Uj.

Such a graph of interests can be built and updated by the recommendation module RM (and more precisely by its sub module RSM) from the data which define the real interests of the users Uj and which are stored into the second storage means SM2.

The sub module RSM may store the interest graph into a third storage means SM3, which may be part of the recommendation module RM as illustrated. This third storage means SM3 may be of any type known from the man skilled in the art. So, it may be a repository or else a memory, for instance.

For instance, the graph of interests may model the evolution of interests over time for a plurality of users Uj. It can be built and updated either directly from the stored data or by means of an aggregation of interest graphs. The last case is more particularly adapted to a situation in which devices D are distributed in the user communication equipments CE. In this case the recommendation module RM (and more precisely its sub module RSM), which belongs to the device D associated to a user Uj, may be arranged for building and updating an auxiliary interest graph, which models the evolution of interests over time for this user Uj, and then for aggregating this auxiliary interest graph with auxiliary interest graphs, built for other users Uj' (by their respective associated devices D), in order to produce an interest graph.

The interest graph may be a directed and weighted graph G(V, W), where V is a set of nodes which represent respectively the user interests, and W is a set of directed edges, which each represent a transition from a user interest $i_{n-1}$ to another user interest $i_n$.

Figure 3:
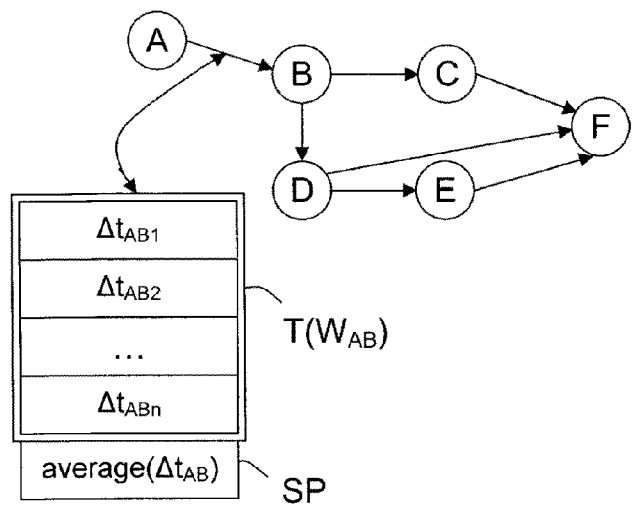

A non limiting example of such a directed and weighted interest graph G(V, W) is illustrated in FIG. 3. Six nodes A, B, C, D, E and F, corresponding respectively to six user interests, constitute this graph G(V, W) with a set of eight directed edges W in this example. More precisely there is a directed edge $W_{AB}$ between nodes A and B, a directed edge $W_{BC}$ between nodes B and C, a directed edge $W_{BD}$ between nodes B and D, a directed edge $W_{CF}$ between nodes C and F, a directed edge $W_{DE}$ between nodes D and E, a directed edge $W_{DF}$ between nodes D and F, and a directed edge $W_{EF}$ between nodes E and F.

A weight is assigned to each directed edge W, for instance by the recommendation module RM (and more precisely by its sub module RSM). As illustrated in the non limiting example, each weight may be defined by a table $T(W_{AB})$ (or $T(W_{BC})$ or . . . or else $T(W_{EF})$). For instance the illustrated table $T(W_{AB})$, which is associated to the directed edge $W_{AB}$, establishes a correspondence between each user Uj (j=1 to n, for instance n=3) and an elapsed time $\Delta t_{ABj}$ between the appearances of the two consecutive real interests that are associated respectively to nodes A and B.

For instance, one assumes that the last known real interests that appeared for a user Uj are those represented by nodes B, D and C in the graph of FIG. 2. Nodes B, D and C constitutes the ordered interest sequence of user Uj. In this illustrated example of graph, node C is connected to nodes B and F, and node D is connected to node B, E and F, but node D is not connected to node C. So one possible transition is from node C to node F. However, given that this transition (C-F) relies only on the last known interest of user Uj, this transition may be a bit weak and of relative low confidence, because in the graph, neither E nor D is connected to C. So, if one ignores node C and considers the previous interest of user Uj (represented by node D), one can see that node D has node B for predecessor in the graph, which represents also a predecessor of the user interest (represented by node D). Therefore one can consider the interests, which are respectively represented by nodes E and F, as potential future interests for user Uj.

If there exists several potential future interests for user Uj (as in the above example), the recommendation module RM (and more precisely its sub module RSM) may compute one or more statistical metrics from the weights of the directed edges W, and then use each determined statistical metric to choose the most appropriate potential future interest.

For instance the sub module RSM may compute a statistical metric such as the standard deviation to estimate the relevance of a transition between two nodes of a graph (and therefore the two corresponding interests). For instance, if the dispersion of values is very high, the transition may be exploitable enough.

The sub module RSM may also compute a statistical metric such as the relative number of entries in the table (or weight) of a directed edge W to estimate the frequency of a transition between two interests, which may indicate if this transition is main stream or if it is something more particular.

Based on these statistical metrics, it is possible to build heuristics that will help suggesting appropriate interests adapted to a chosen applicative context and then predicting at least one potential future interest for a user Uj from these suggested interests. For example, depending on the application context, it may be more interesting to emphasize non-main stream evolutions of user interests because it could lead to "long-tail" content.

An heuristic may consist in looking into the interest graph for the longest sequence of interests $i_k, i_{k+1}, \ldots, i_n$ extracted from the known sequence of interests of the considered user Uj. It is also possible to relax the search by considering incomplete sequences, especially in the case where the determined relevance metric between two possible interests is low or if the frequency of the transition between two possible interests is low, which means that this is a marginal transition. So, one can select the next node $i_{n+1}$ in the interest graph for which the frequency of transition between $i_n$ and $i_{n+1}$ is the highest (this heuristic favors a main stream interest evolution).

The recommendation module RM (and more precisely its sub module RSM) may be also arranged for determining a favourable date for introducing a potential future interest into the profile of a user Uj. For this purpose, it may, for instance, use the weight(s) of the directed edge W between the last interest of this user Uj and the predicted one(s). For instance, it may compute the average value (average($\Delta t_{AB}$)) of the table associated to the selected directed edge W and then wait until a timer, scheduled with this average value, expires before recommending the new corresponding interest to the user Uj or before recommending this new corresponding interest in order it could be introduced into the profile of this user Uj.

Figure 4:
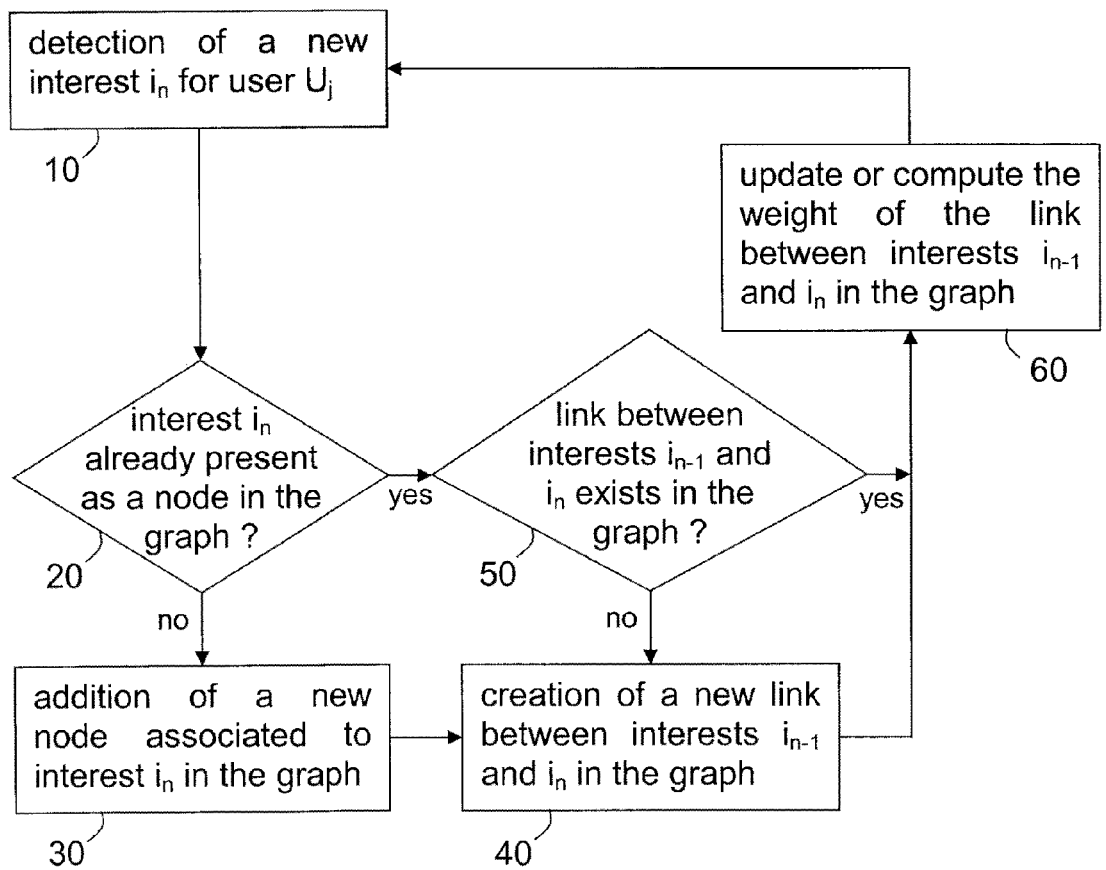

To predict a future interest of a given user Uj, the recommendation module RM may implement an algorithm such as the one described hereafter with reference to FIG. 4.

This algorithm begins with a step 10 when a new real interest $i_n$ has been detected for a user Uj by the tracking module TM.

Then in a step 20 one (RM) carries out a first test to determine if this new real interest $i_n$ is already present as a node in the interest graph. If this is not the case, one (RM) adds a new node (representing the new real interest $i_n$) to the interest graph, in a step 30.

Then in a step 40 one (RM) creates a link (or directed edge W) between the two nodes representing interests $i_{n-1}$ and $i_n$ in the interest graph.

Then one (RM) computes a weight for the link (or directed edge W) between the two nodes representing interests $i_{n-1}$ and $i_n$ in the interest graph, in a step 60.

Now, if the first test carried out in step 20 indicates that the new real interest $i_n$ is already present as a node in the interest graph, one (RM) carries out a second test in step 50 to determine if a link (or directed edge W) between the two nodes representing interests $i_{n-1}$ and $i_n$ exists in the interest graph. If this is not the case, one (RM) carries out step 40 (to create a new link) and then step 60 (to compute a weight for this new link).

If the second test indicates that the link (or directed edge W) between the two nodes representing interests $i_{n-1}$ and $i_n$ exists already in the interest graph, one (RM) carries out step 60 to update the weight of this link. This would enable to recommend to the user Uj a content in relationship to that interest, without waiting for a long time until this user Uj would have consumed enough content related to that interest. So, thanks to the invention, the user may have access faster to content he may be interested in, even before he has demonstrated a proven interest for this type of content.

The invention can provide significant advantages to content-based filtering algorithms (because it avoids over specialisation) without having the same issue(s) as the one(s) presented by collaborative filtering methods (such as cold-start). Moreover the invention does not need user ratings.

The invention is not limited to the embodiments of device, network equipment and communication equipment described above, only as examples, but it encompasses all alternative embodiments which may be s considered by one skilled in the art within the scope of the claims hereafter.

The invention claimed is:

1. A device for determining potential interests of users that are clients of at least one network operator, the users being associated with profiles defining the interests of the users, the device comprising:
   a processor; and
   memory storing instructions that, when executed, cause the device to:
   analyze at least one profile of at least one user to determine new real interests associated with the at least one profile by determining the consumption of content items of said at least one user that are related to an interest contained in the profile of said at least one user and considering the interest is a new real interest when said determined consumption of the related content items is greater than a chosen threshold;
   store an identifier representative of a determined new real interest of said at least one user in correspondence with a first date at which it has been considered as a new real interest into the at least one profile of said at least one user;
   analyze one or more first dates of said at least one user to determine a time ordered sequence of interests preceding a determined new real interest; and
   compare the determined user interest sequence to at least one other sequence of interests of at least one other user to predict at least one potential future interest for said at least one user, to be introduced into the at least one profile of said at least one user.

2. The device according to claim 1, wherein said memory stores further instructions to compare said determined user interest sequence to at least one other sequence of interests, determined into a graph of interests built from the interests of other users, to predict at least one potential future interest of said at least one user.

3. The device according to claim 2, wherein said memory stores further instructions to build and update said interest graph from the stored real interests of said users.

4. The device according to claim 1, wherein said memory stores further instructions to build and update an interest graph which models the evolution of interests over time for a plurality of users.

5. The device according to claim 1, wherein said memory stores further instructions to build and update an auxiliary interest graph, which models the evolution of interests over time for one user, then aggregates said auxiliary interest graph with auxiliary interest graphs, built for other users, to produce an interest graph.

6. The device according to claim 4, wherein said memory stores further instructions to build and update a directed and weighted interest graph G(V, W), where V is a set of nodes representing respectively said user interests, and W is a set of directed edges representing a transition from a user interest to another user interest.

7. The device according to claim 6, wherein said memory stores further instructions to assign a weight to said directed edges, the weights being defined by a table establishing a correspondence between the users and an elapsed time between the appearances of first and second consecutive real interests.

8. The device according to claim 4, wherein said memory stores further instructions to update said interest graph when said device has determined a new real interest of a user.

9. The device according to claim 6, wherein said memory stores further instructions to determine at least one statistical metric from said weights assigned to said directed edges and for using each determined statistical metric with heuristics to suggest interests adapted to a chosen applicative context and then to predict at least one potential future interest for said user from said suggested interests.

10. The device according to claim 9, wherein at least one statistical metric is representative of the relevance between two interests.

11. The device according to claim 9, wherein at least one statistical metric is representative of the frequency of a transition between two interests.

12. The device according to claim 1, wherein said memory stores further instructions to consider that the first date of an interest is the date at which the device detects that a content item consumption related to said interest is greater than said chosen threshold.

13. The device according to claim 1, wherein said memory stores further instructions to determine a favorable date for introducing said potential future interest into the profile of said user.

14. The device according to claim 1, wherein said memory stores further instructions to store a second date in correspondence with an interest identifier, a user identifier and a first date when the interest strength of a user interest is smaller than the chosen threshold and the user interest is not a real interest for the user.

15. Network equipment for at least one communication network, said network equipment comprising a device according to claim 1 and configured to work in a centralized manner to predict potential future interests for a plurality of users.

16. Communication equipment for a user that is connected to at least one communication network, wherein said communication equipment comprises a device according to claim 1 and is configured to predict potential future interests for said user.

17. A method of determining potential interests of users that are clients of at least one network operator, the users being associated with profiles defining the interests of the users, the method comprising:

analyzing at least one profile of at least one user to determine new real interests associated with the at least one profile by determining the consumption of content items of said at least one user that are related to an interest contained in the profile of said at least one user and considering the interest is a new real interest when said determined consumption of the related content items is greater than a chosen threshold;

storing an identifier representative of a determined new real interest of said at least one user in correspondence with a first date at which it has been considered as a new real interest into the at least one profile of said at least one user;

analyzing one or more first dates of said at least one user to determine a time ordered sequence of interests preceding a determined new real interest; and comparing the determined user interest sequence to at least one other sequence of interests of at least one other user to predict at least one potential future interest for said at least one user, to be introduced into the at least one profile of said at least one user.

18. The method according to claim 17, further comprising comparing said determined user interest sequence to at least one other sequence of interests, determined into a graph of interests built from the interests of other users, to predict at least one potential future interest of said at least one user.

19. The method according to claim 17, further comprising building and updating said interest graph from the stored real interests of said users.

20. The method according to claim 17, further comprising building and updating an interest graph which models the evolution of interests over time for a plurality of users.

\* \* \* \* \*